(12) United States Patent
Chen

(10) Patent No.: US 8,662,100 B2
(45) Date of Patent: Mar. 4, 2014

(54) TUBE CLAMPING AND CLOSING DEVICE

(76) Inventor: Jun Fan Chen, Taichung (TW)

(*) Notice: Subject to any disclaimer, the term of this patent is extended or adjusted under 35 U.S.C. 154(b) by 89 days.

(21) Appl. No.: 13/481,697

(22) Filed: May 25, 2012

(65) Prior Publication Data

US 2013/0313450 A1 Nov. 28, 2013

(51) Int. Cl.
*F16K 43/00* (2006.01)
(52) U.S. Cl.
USPC .......................................... 137/315.01; 138/89
(58) Field of Classification Search
USPC .................................. 138/89, 92; 137/315.01
See application file for complete search history.

(56) References Cited

U.S. PATENT DOCUMENTS

| | | | | |
|---|---|---|---|---|
| 378,878 A | * | 3/1888 | Eunson | 122/360 |
| 545,968 A | * | 9/1895 | Mueller | 29/213.1 |
| 2,417,265 A | * | 3/1947 | Nelsen et al. | 169/90 |
| 4,417,890 A | * | 11/1983 | Dennehey et al. | 604/256 |
| 4,529,007 A | * | 7/1985 | Goforth | 138/89 |
| 4,936,351 A | * | 6/1990 | Wells et al. | 138/89 |
| 5,560,396 A | * | 10/1996 | Kramer, Jr. | 138/109 |
| 5,657,792 A | * | 8/1997 | Prest | 138/89 |
| 5,881,774 A | * | 3/1999 | Utterberg | 138/89 |
| 5,896,892 A | * | 4/1999 | Adamson et al. | 138/89 |
| 7,954,515 B2 | * | 6/2011 | Gerst | 138/89 |
| 8,522,826 B1 | * | 9/2013 | Shih | 138/89 |
| 2012/0160341 A1 | * | 6/2012 | Moran | 137/315.01 |
| 2013/0186500 A1 | * | 7/2013 | Chen | 138/89 |

* cited by examiner

*Primary Examiner* — John K Fristoe, Jr.
*Assistant Examiner* — Umashankar Venkatesan

(57) ABSTRACT

The present invention provides a tube clamping and closing device which includes a main body having a first end and a second end, and a retaining assembly having several kinds of work portions and disposed at the second end of the main body. The first end has a first clamping member extending laterally and having a threaded hole extending vertically. A blocking member is threadedly connected to the threaded hole and adapted for closing an opening of a tube. The work portions alternatively define a clamping space with the first clamping member and the main body. Whereby a single device of the present invention can be used for different kinds of tubes or multiport valves. The present invention has advantages of operating conveniently, carrying and putting away easily, saving space and costs, etc.

6 Claims, 4 Drawing Sheets

TUBE CLAMPING AND CLOSING DEVICE

BACKGROUND OF THE INVENTION

1. Field of the Invention

The present invention relates to a clamping device, more particularly, to a tube clamping and closing device for closing an opening of a tube.

2. Description of the Prior Art

A conventional large-sized machine or apparatus is generally equipped with various tubes, whose diameters are different, or multiport valves, whose sizes of port openings are different, for liquids or gases flowing therein between machines. When detaching a machine, the user usually uses the tube clamping and closing device as disclosed in patent TW D142958, to closing the openings of the tubes or the multiport valves for avoiding the leakage of liquids or gases.

However, one set of the conventional tube clamping and closing device can only be applied to one kind of tube or multiport valve, so the user has to prepare plural kinds of the conventional tube clamping and closing devices for different kinds of tubes or multiport valves, respectively, and this is unpractical and cots a lot.

Moreover, the conventional tube clamping and closing device can only be applied to a flexible tube with a specific diameter. For a flexible tube with a small diameter, it can easily slip away out of the gap between two jaw portions. For a flexible tube with a large diameter, since the largest width of the gap between the two jaw portions is limited, the gap is not capable of allowing the large-diameter flexible tube being placed therewithin if the diameter of the large-diameter flexible tube is larger than the largest width of the gap, and thus the conventional tube clamping and closing device is insufficient for use.

In addition, the conventional tube clamping and closing device can only be applied to a flexible tube having a tube wall with a specific thickness. If the tube wall of the flexible tube has an unsuitable thickness, the conventional tube clamping and closing device will provide an insufficient clamping force for clamping the flexible tube firmly, and thus the flow channel of the flexible tube cannot be completely closed.

The present invention is, therefore, arisen to obviate or at least mitigate the above mentioned disadvantages.

SUMMARY OF THE INVENTION

The main object of the present invention is to provide a tube clamping and closing device which is used for clamping tubes, whose diameters are different, or multiport valves, whose sizes of port openings are different.

To achieve the above and other objects, a tube clamping and closing device of the present invention includes a main body and a retaining assembly.

The main body comprises a first end and a second end. The first end has a first clamping member extending laterally. The first clamping member is formed with a threaded hole extending vertically. A blocking member is threadedly connected to the threaded hole, and one end of the blocking member is adapted for closing an opening of a tube.

The retaining assembly is disposed at the second end of the main body.

The retaining assembly comprises at least two kinds of work portions. The work portions alternatively define a clamping space with the first clamping member and the main body.

Whereby, the at least two kinds of work portions can be alternatively used to for clamping and closing different kinds of tubes, whose diameters are different, or different kinds of multiport valves, whose sizes of port openings are different. The present invention has some advantages, such as operating conveniently, carrying and putting away easily, saving space and costs, etc.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
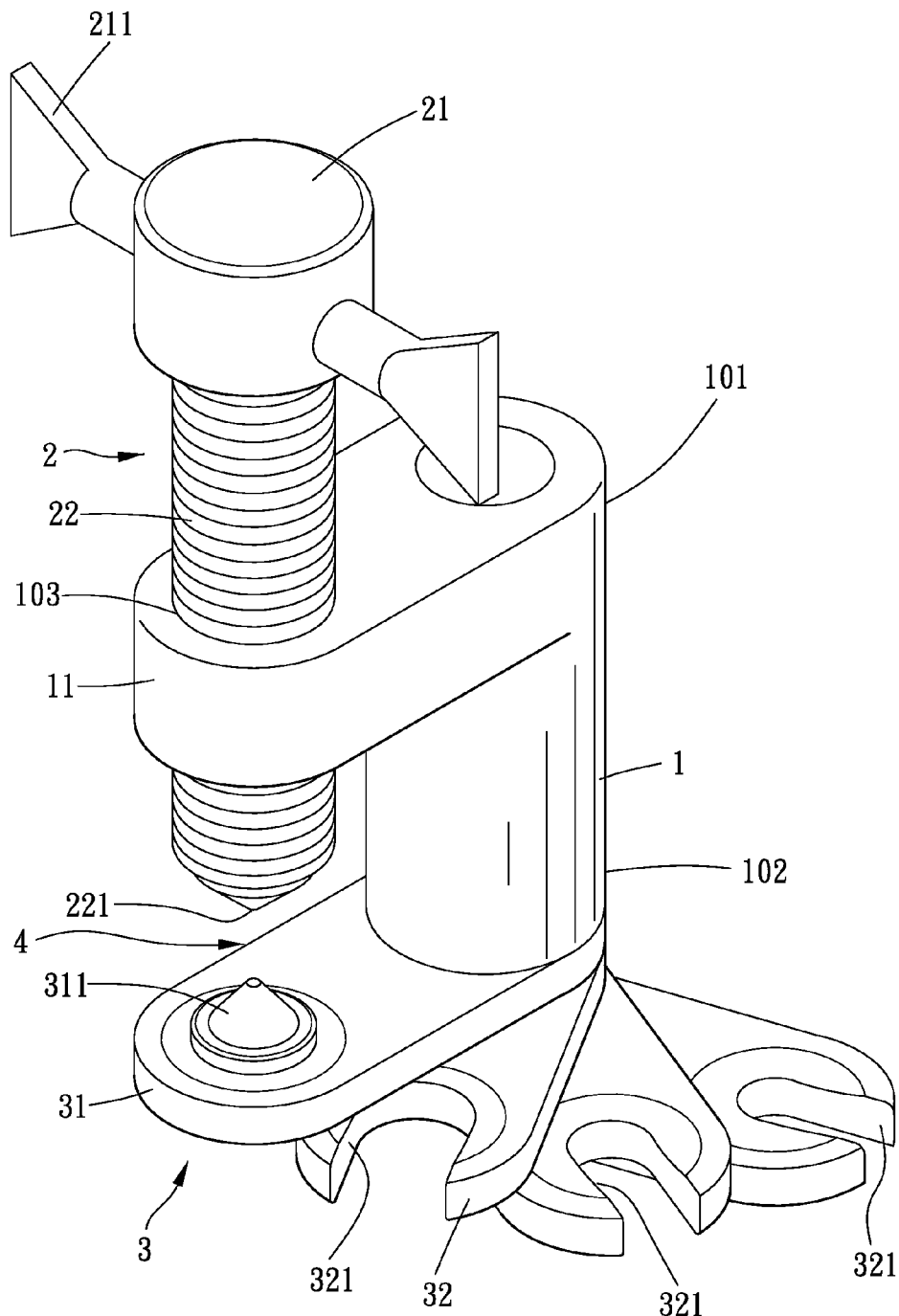
FIG. 1 is a stereogram showing a first embodiment of the present invention.

As shown in FIG. 1, a tube clamping and closing device according to a first embodiment of the present invention includes a main body 1, a blocking member 2 and a retaining assembly 3.

The main body 1 comprises a first end 101 and a second end 102. The first end 101 has a first clamping member 11 extending laterally. In this embodiment, the first clamping member 11 integrally extends from the first end 101 of the main body 1. In other embodiments, the first clamping member 11 may be detachably disposed at the first end 101 of the main body 1, or may be capable of rotating around an axis correspondingly to the main body 1. The free end of the first clamping member 11 is formed with a threaded hole 103 extending vertically, wherein the direction along which the threaded hole 103 extends is perpendicular to the direction along which the first clamping member 11 extends.

The blocking member 2 includes a head portion 21 and a body portion 22, the head portion 21 is formed with a handling structure 211, and one end of the body portion 22 is formed with a bung structure 221. The body portion 22 is threadedly connected to the threaded hole 103 such that the blocking member 2 can move up and down along the threaded hole 103.

The retaining assembly 3 is disposed at the second end 102 of the main body 1. The retaining assembly 3 comprises at least two kinds of work portions. The work portions can alternatively define a clamping space 4 with the first clamping member 11 and the main body. In this embodiment, the retaining assembly 3 comprises a plurality of second clamping members 31, 32, each of the second clamping members 31, 32 comprises a first end and a second end, and the first end of each second clamping member is formed with one kind of the work portions. Some of the work portions are stoppers 311 (only an exemplary work portion, i.e. one stopper 311, shown in FIG. 1), and some of the work portions are clamping slots 321. The stoppers 311 are different from each other in size so that the tube clamping and closing device of the invention can be used for clamping kinds of multiport valves, whose size of port openings are different. The clamping slot 321 are different from each other, more specifically, the clamping slot 321 have widths different from each other, such that the tube clamping and closing device of the invention can be used for clamping different kinds of tubes, whose diameters are different. The second end of the respective second clamping members 31, 32 is rotatably disposed at the second end 102 of the main body 1, more specifically, as shown in FIG. 1, the second end of one of the second clamping members 31 is directly disposed at the second end 102 of the main body 1 while the second ends of the rest second clamping members 32 are connected to the second clamping members 31 in sequence, and through this way the second clamping members 32 are indirectly connected to the second end 102 of the main body 1. An user can rotate the work portion (the stopper 311 or the clamping slot 321) which is located at the first end of one of the second clamping members 31, 32 to underneath the first clamping member 11, to define the clamping space 4 with the first clamping member 11 and the main body 1. Through the above fabrication, the second end of the respective second clamping members 31, 32 may be optionally detachably disposed directly or indirectly at the second end 102 of the main body 1, or it may be undetachably disposed directly or in directly at the second end 102 of the main body 1. In other embodiments, when being detachably disposed at the second end 102 of the main body 1, the second end of the respective second clamping members 31, 32 may also be unrotatably assembled at the second end 102 of the main body 1.

Figure 2:
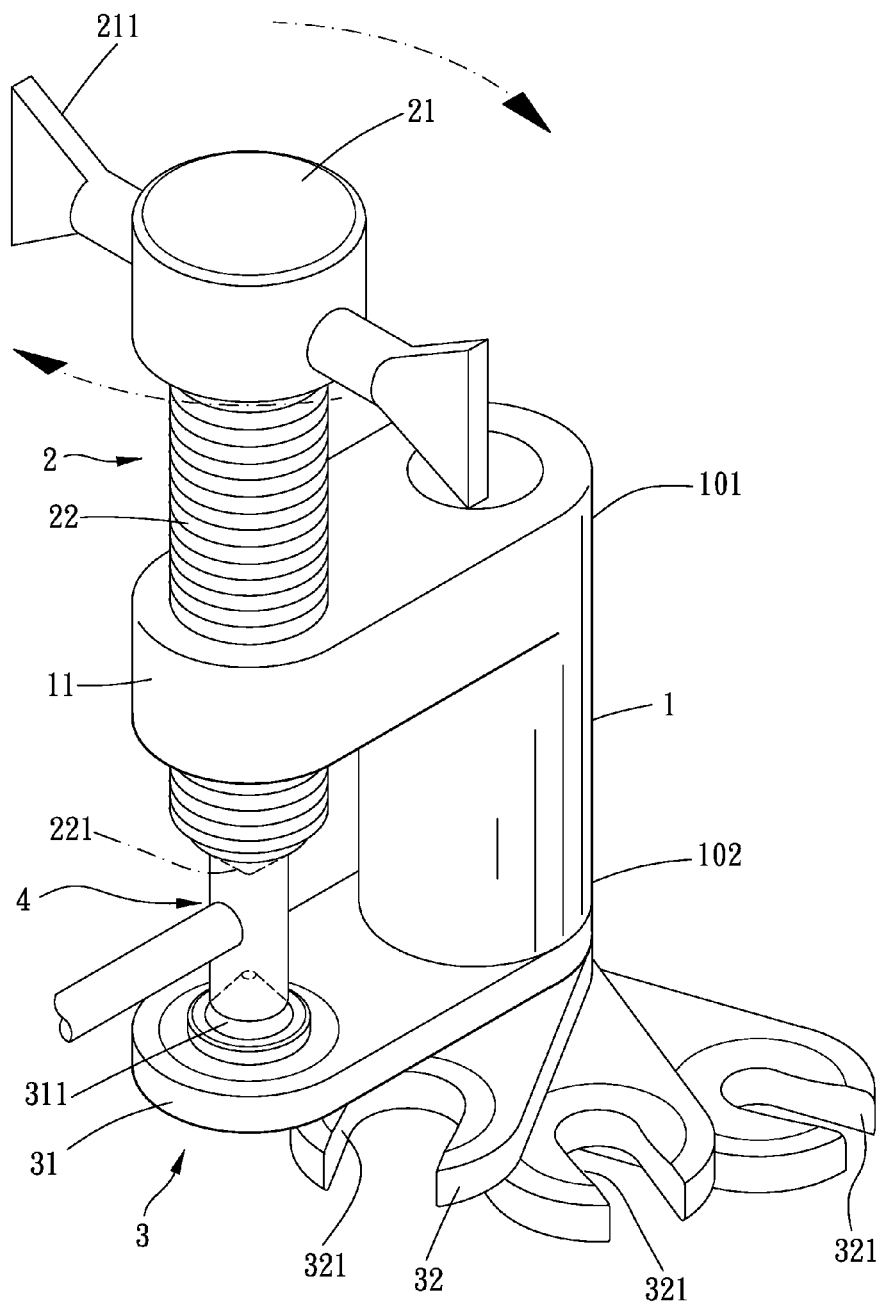
FIG. 2 is a drawing showing a stopper closing a tube according to the first embodiment of the present invention.

As shown in FIG. 2, when the tube clamping and closing device is used to clamp a tri-port valve according to the first embodiment of the present invention, the stopper 311 which is located at the first end of the second clamping member 31 is moved to underneath the first clamping member 11, and the stopper 311 of the second clamping member 31, the first clamping member 11 and the main body 1 define the clamping space 4. The tri-port valve is then placed in the clamping space 4, and one of the port openings of the tri-port valve is aligned with the stopper 311 of the second clamping member 31. The user can use one hand to rotate the blocking member 2 by holding and driving the handling structure 211, so that the body portion 22 of the blocking member 2 is threadedly connected to and runs downward through the threaded hole 103 until another port opening of the tri-port valve is closed by the bung structure 221 of the body portion 22.

Figure 3:
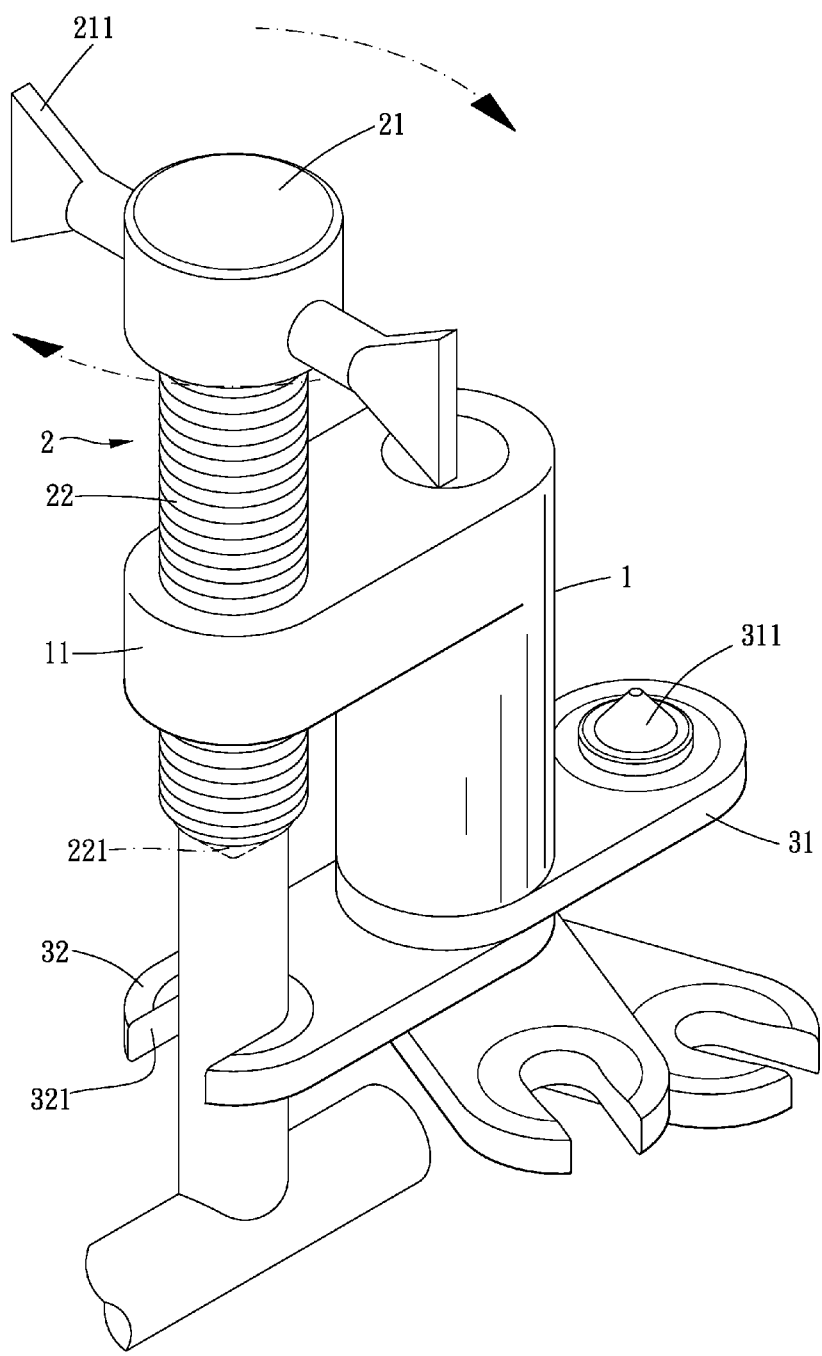
FIG. 3 is a drawing showing a clamping slot clamping a tube according to the first embodiment of the present invention.

As shown in FIG. 3, to clamping a tube, the second clamping member 31 (whose work portion is a stopper 311) which defines the clamping space 4 with the first clamping member 11 and the main body 1 can be replaced by the second clamping member 32 whose work portion is a clamping slot 321, in a rotating manner or a detaching-assembling manner, and the clamping space is defined by the second clamping member 32 whose work portion is a clamping slot 321, the first clamping member 11 and the main body 1. The tube is then placed within the clamping slot 321, and thus the clamping slot 321 can clamp the tube. Subsequently, the blocking member 2 is rotated by hand until the opening of the tube is closed by the bung structure 221 of the body portion 22. In short, the user may make sure of what kind of work portion (the stopper 311 or the clamping slot 321) to be used according to actual requirements, then decides the required size of the work portion, and carries out the above operation to clamp and close the opening of the tube or the multiport valve, so as to avoid leakage of liquids or gases in tubes, whose diameters are different or multiport valves, whose sizes of port openings are different.

Figure 4:
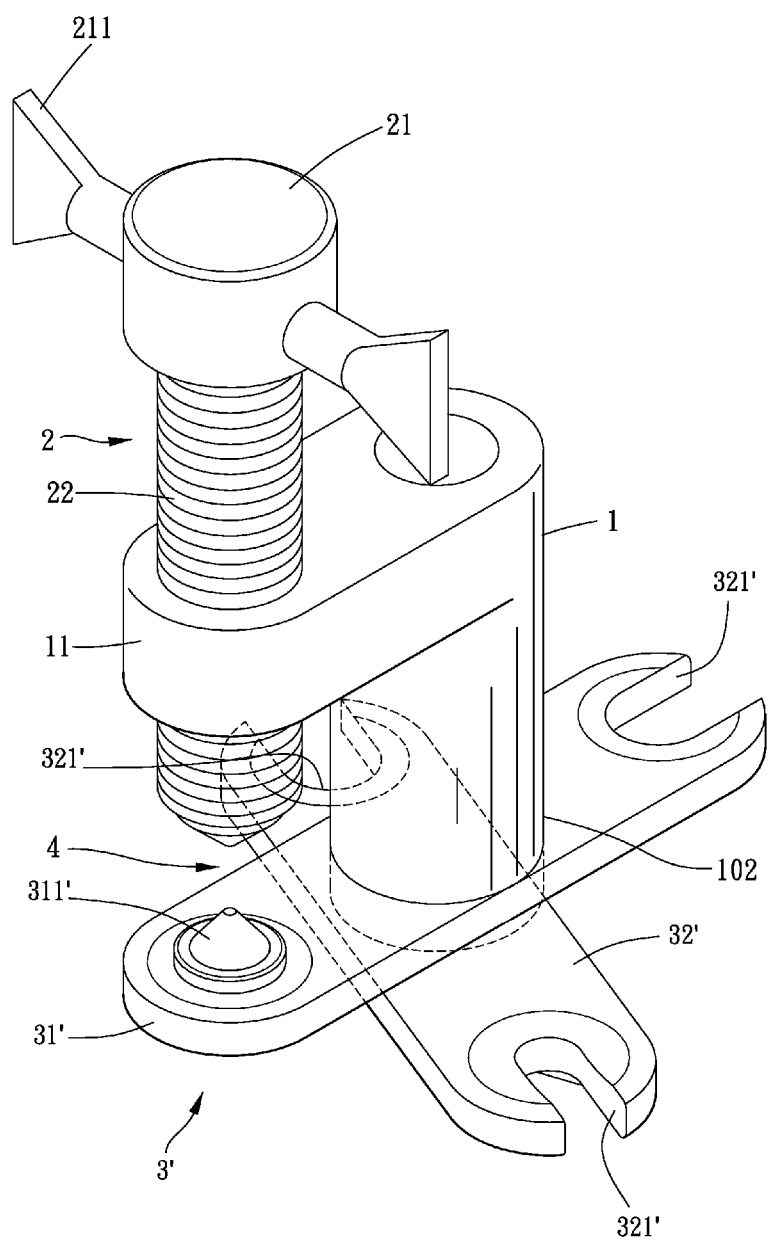
FIG. 4 is a stereogram showing a second embodiment of the present invention.

As shown in FIG. 4, in a second embodiment of the present invention, the retaining assembly 3' comprises a plurality of second clamping members 31', 32', each of the second clamping members 31', 32' comprises a first end, a second end and a middle portion between the first end and second end, and the two kinds of work portions are disposed at the first end and second end of the respective second clamping member 31', 32', respectively. One of the two work portions of some second clamping members 31' is a stopper 311' and the other a clamping slot 321'. Alternatively, two work portions of some second clamping member 32' are clamping slots 321' (as shown in FIG. 4) or both stoppers 311' (not shown). The stoppers 311' are different from each other in size, and the clamping slots 321' are different from each other in slot width. The middle portion is rotatably disposed at the second end 102 of the main body 1. Like the second clamping members 31, 32 in the first embodiment, the second clamping members 31', 32' may be detachably or undetachably disposed directly or indirectly at the second end 102 of the main body 1. In other embodiments, when being detachably disposed at the second end 102 of the main body 1, the middle portion of the respective second clamping members 31', 32' may be unrotatably disposed at the second end 102 of the main body 1. As to the alternation of the work portions of the respective second clamping members 31', 32', under some circumstances, the work portions of the first and second ends of the respective second clamping members 31', 32' are alternated with each other by rotating the second clamping members 31', 32' directly. Under some other circumstances, one of the second clamping members 31', 32' might be rotated to move its first and second ends away first, and the other of the second clamping members 31', 32' is then rotated, so that alternative of the work portions of the first and second ends, the first clamping member 11 and the main body 1 define the clamping space 4. It is noted that the detaching-assembling manner as stated in previous paragraph may be applied to the aforementioned alternation of the work portions. As to the objective of the alternation of the work portions and the process of clamping and closing the opening of the tube or the multiport valve, they are well described in previous paragraph and therefore not described again.

In the first and second embodiments of the present invention, the second clamping members are formed in sheet shape, and this facilitates the use of the rotation manner or the detaching-assembling manner to align the second clamping members in a row, thus having advantages of putting away and carrying easily. In other embodiments, the second clamping members may be formed in disk shape (not shown), and the axis of the respective second clamping members is rotatably disposed at the second end of the main body. The second clamping member includes a top surface with plural kinds of work portions formed around the periphery thereof. The user has to only rotate the second clamping member (stoppers with different sizes or clamping slots with different widths) to choose what kind of work portion to be used, and it is very convenient and utility.

Since the alternation of the second clamping members of the work portions can be carried out by using the rotation manner or the detaching-assembling manner, the user only has to purchase one tube clamping and closing device of the present invention, and it is sufficient for clamping and closing the openings of tubes with different diameters or multiport valves with different port opening sizes. Hence, the tube clamping and closing device is easy to use and can provide excellent effects of clamping and closing openings of tubes with different diameters or multiport valves with different port opening sizes, so as to avoid leakage of liquids or gases in tubes or multiport valves.

Moreover, the tube clamping and closing device of the present invention has a flexible expendability to allow the user to change one second clamping member by different one, and thus the user only needs to carry fewer required second clamping members that should be used during every time of working.

Given the above, different kinds of the work portions of the tube clamping and closing device of the present invention can be used alternatively, and are adapted for clamping and closing the openings of tubes with different diameters or multi-port valves with different port opening sizes, so that the present invention has inventive effects of operating conveniently, various ways in use, carrying and putting away easily, saving space and costs, etc.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tube clamping and closing device, including:
   a main body, comprising a first end and a second end, the first end having a first clamping member extending laterally, the first clamping member formed with a threaded hole extending vertically, wherein a blocking member is threadedly connected to the threaded hole, and one end of the blocking member is adapted for closing an opening of a tube; and
   a retaining assembly, disposed at the second end of the main body,
   wherein the retaining assembly comprises at least two kinds of work portions, and the work portions alternatively define a clamping space with the first clamping member and the main body;
   wherein the retaining assembly comprises two second clamping members, each of the second clamping members comprises a first end and a second end, the first end of each second clamping member is formed with one kind of the work portions, and the second end of each second clamping member is rotatably disposed at the second end of the main body.

2. The tube clamping and closing device of claim 1, wherein the work portions are clamping slots, whose slot widths are different.

3. The tube clamping and closing device of claim 1, wherein at least one kind of the work portions is a stopper.

4. A tube clamping and closing device, including:
   a main body, comprising a first end and a second end, the first end having a first clamping member extending laterally, the first clamping member formed with a threaded hole extending vertically, wherein a blocking member is threadedly connected to the threaded hole, and one end of the blocking member is adapted for closing an opening of a tube; and
   a retaining assembly, disposed at the second end of the main body,
   wherein the retaining assembly comprises at least two kinds of work portions, and the work portions alternatively define a clamping space with the first clamping member and the main body;
   wherein the retaining assembly comprises two second clamping members, each of the second clamping members comprises a first end and a second end, the first end of each second clamping member is formed with one kind of the work portions, and the second end of each second clamping member is detachably disposed at the second end of the main body.

5. The tube clamping and closing device of claim 4, wherein the work portions are clamping slots, whose slot widths are different.

6. The tube clamping and closing device of claim 4, wherein at least one kind of the work portions is a stopper.

* * * * *